(12) United States Patent
Davis et al.

(10) Patent No.: US 9,612,980 B2
(45) Date of Patent: Apr. 4, 2017

(54) FIELD CALIBRATION SYSTEM AND METHOD

(71) Applicant: Meriam/Scott Fetzer Company, Westlake, OH (US)

(72) Inventors: Thomas V. Davis, Akron, OH (US); John W. Merrill, North Ridgeville, OH (US); Bryan E. Pavlovic, Strongsville, OH (US)

(73) Assignee: Meriam/Scott Fetzer Company, Cleveland, OH (US)

( * ) Notice: Subject to any disclaimer, the term of this patent is extended or adjusted under 35 U.S.C. 154(b) by 0 days.

(21) Appl. No.: 14/658,889

(22) Filed: Mar. 16, 2015

(65) Prior Publication Data

US 2015/0269095 A1 Sep. 24, 2015

Related U.S. Application Data

(60) Provisional application No. 61/968,661, filed on Mar. 21, 2014.

(51) Int. Cl.
| | |
|---|---|
| *G06F 3/00* | (2006.01) |
| *G06F 13/12* | (2006.01) |
| *G06F 13/40* | (2006.01) |
| *G01C 17/38* | (2006.01) |

(52) U.S. Cl.
CPC .......... *G06F 13/122* (2013.01); *G01C 17/38* (2013.01); *G06F 13/4068* (2013.01); *G06F 13/124* (2013.01)

(58) Field of Classification Search
CPC ...... A61B 18/1492; A61B 2018/00797; A61B 2018/00791; G06F 13/122; G06F 13/124; G06F 13/4068; G01C 17/38; G01C 17/28
See application file for complete search history.

(56) References Cited

U.S. PATENT DOCUMENTS

| | | | |
|---|---|---|---|
| 2005/0010206 A1* | 1/2005 | Nasab ................ | A61B 18/1206 606/41 |
| 2011/0022700 A1* | 1/2011 | Ramanath ............ | G06F 3/0481 709/224 |

\* cited by examiner

*Primary Examiner* — Ernest Unelus
(74) *Attorney, Agent, or Firm* — Tarolli, Sundheim, Covell & Tummino LLP; John A. Yirga, Esq.

(57) ABSTRACT

A calibration system and method having a portable calibration apparatus comprising at least one input/output (I/O) channel to measure or simulate one or more functions of a remote device. The I/O channel being in coupled communication with a microcontroller. The portable calibration apparatus further comprising an internal power supply to provide power to the I/O channel. The internal power supply can also provide power to the microcontroller. The calibration system can also include a user interface to enable selection of at least one of a total number of functions of the I/O channel.

21 Claims, 5 Drawing Sheets

FIELD CALIBRATION SYSTEM AND METHOD

CROSS-REFERENCE TO RELATED APPLICATIONS

The present application claims priority to U.S. Provisional Patent Application Ser. No. 61/968,661 filed Mar. 21, 2014 entitled FIELD CALIBRATION SYSTEM AND METHOD, the entire contests of the above-identified application is incorporated herein by reference in its entirety for all purposes.

FIELD OF THE DISCLOSURE

The present disclosure relates to a field calibration system and method, and more particularly, to a field calibration system and method used to perform high-accuracy measurements and calibrations of remote devices/instrumentation.

SUMMARY

One aspect of the present disclosure includes a portable calibration apparatus. The portable calibration apparatus can include a plurality of input/output (I/O) channels. Each of the plurality of I/O channels can measure or simulate one or more functions of a remote device. The portable calibration apparatus can also include a user interface to enable selection of at least one of a number of total functions of at least one of the plurality of I/O channels. The portable calibration apparatus can also include an internal power supply to provide an operating power to the plurality of I/O channels.

Another aspect of the present disclosure includes a calibration system. The calibration system can include a user interface to receive an input selecting at least one of a plurality of calibration functions. The calibration system can also include a central controller to configure a calibration procedure for a remote device based on the input. The calibration system can also include a power source to provide operating power to the central controller.

A further aspect of the present disclosure includes a method for calibrating a remote device. The method can be performed by a portable calibration apparatus including a central controller and at least one I/O channel to interface with the remote device. The method can include receiving an input selecting at least one of a plurality of calibration functions able to be performed by at least one channel of the portable controller device. The method can also include configuring a calibration procedure for the remote device based on the input. The method can also include performing the calibration of the remote device according to the calibration procedure. The method can also include logging results of the calibration procedure.

BRIEF DESCRIPTION OF THE SEVERAL VIEWS OF THE DRAWINGS

The foregoing and other features and advantages of the present disclosure will become apparent to one skilled in the art to which the present disclosure relates upon consideration of the following description of the disclosure with reference to the accompanying drawings, wherein like reference numerals, unless otherwise described refer to like parts throughout the drawings and in which.

Figure 1:
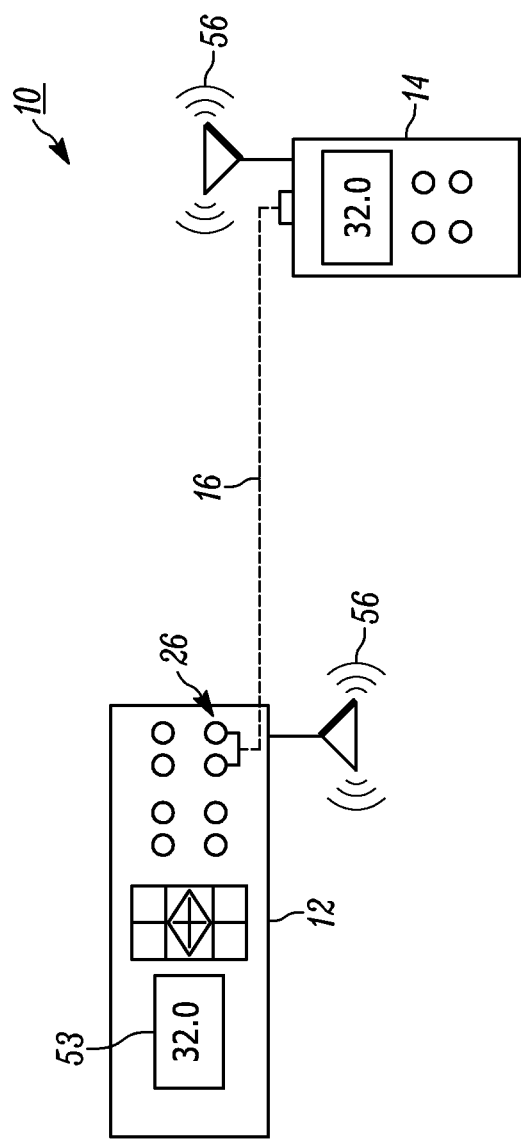
FIG. 1 is a schematic of a calibration system constructed in accordance with one example embodiment of the present disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of the example embodiments of the present disclosure.

The apparatus, system, and method components have been represented where appropriate by conventional symbols in the drawings, showing only those specific details that are pertinent to understanding the example embodiments of the present disclosure so as not to obscure the disclosure with details that will be readily apparent to those of ordinary skill in the art having the benefit of the description herein.

DETAILED DESCRIPTION

Referring sow to the figures generally wherein like numbered features shown therein refer to like elements having similar characteristics and operational properties throughout unless otherwise noted. The present disclosure relates to a field calibration system and method, and more particularly, a field calibration system and method used to perform high-accuracy measurements and calibrations of remote devices/instrumentation.

Illustrated in FIG. 1 is a field calibration system 10 constructed in accordance with one example embodiment of the present disclosure. In the illustrated example embodiment, the field calibration system 10 comprises a calibration apparatus 12 and a remote transceiver 14 apparatus. The calibration apparatus 12 can be portable/moveable. The calibration apparatus 12 communicates with the remote transceiver 14 apparatus via communication link 16. The communication link 16 provides communication between the remote transceiver 14 apparatus and calibration apparatus 12 in a digital, analog, or combination of both over either a hard wired or wireless protocol. In the illustrated example embodiment, the remote transceiver 14 apparatus is a parameter instrument that reads parameters relating to fluid flow, transmission, temperature, pressure, viscosity, any combination thereof, and the like. The calibration apparatus 12, in addition to reading parameters from the remote transceiver 14 apparatus, audits and adjust the measuring elements and diagnostics located therein.

Figure 2:
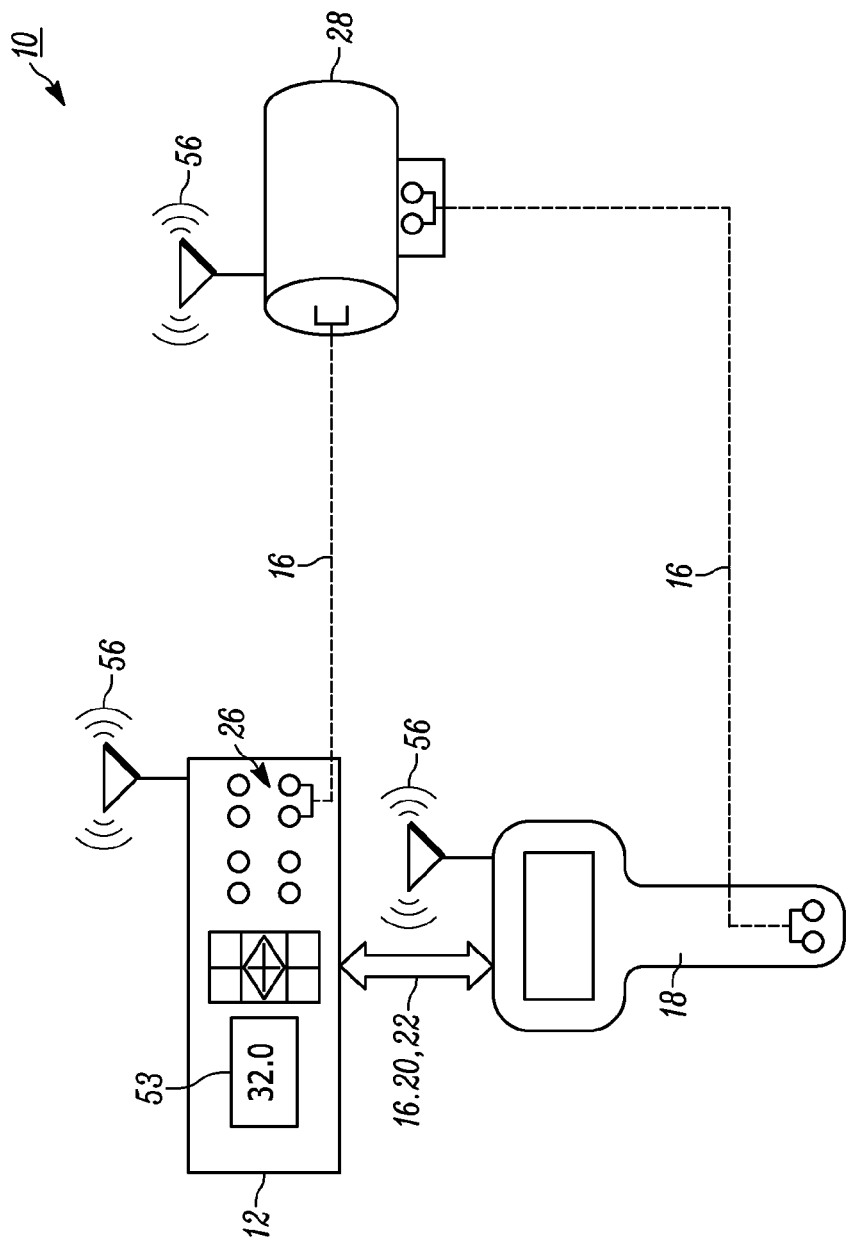
FIG. 2 is a schematic of a calibration system constructed in accordance with another example embodiment of the present disclosure.
Figure 3:
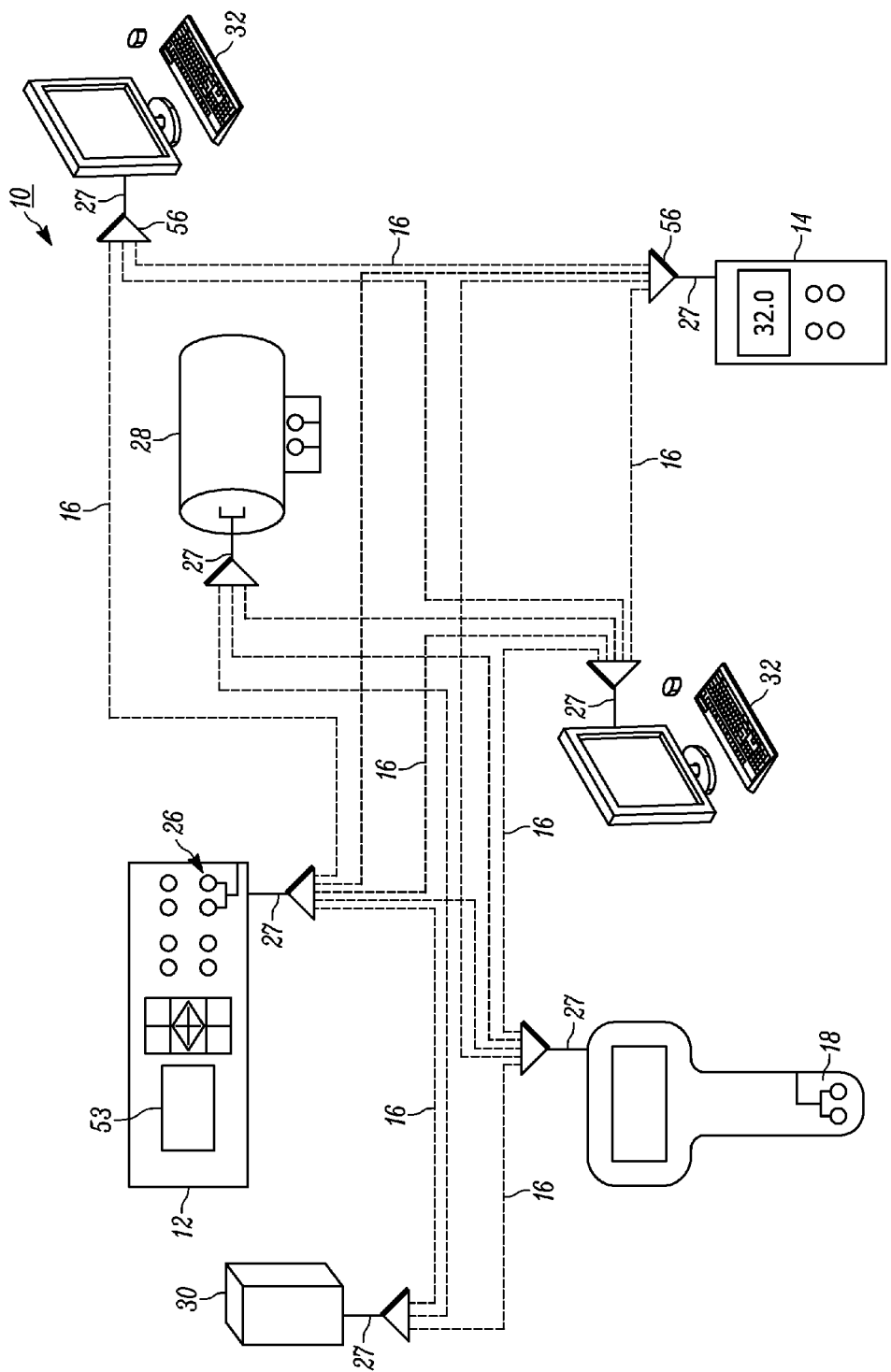
FIG. 3 is a schematic of a calibration system constructed in accordance with yet another example embodiment of the present disclosure.
Figure 4:
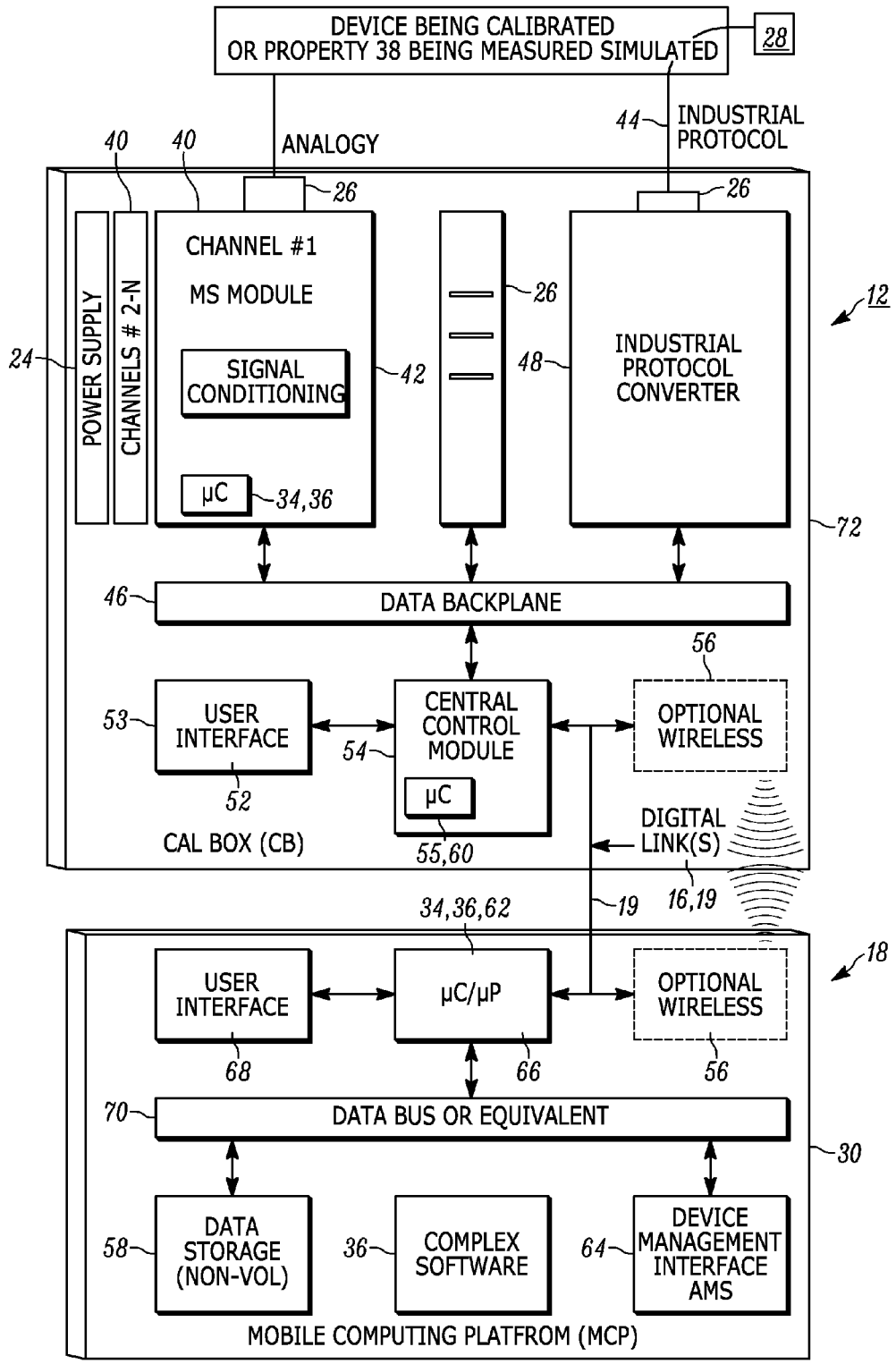
FIG. 4 is a block diagram of a calibration apparatus and mobile computing platform constructed in accordance with another example embodiment of the present disclosure.

The calibration apparatus 12, as further illustrated and described with respect to the illustrated example embodiment of the block diagram of FIG. 4 is a mobile measuring and calibrating device capable of use in controlled, industrial, harsh, and hazardous environmental conditions. The calibration apparatus 12 functions as a stand-alone (or "simple") manner as illustrated in the example embodiment of FIG. 1. Alternatively, the calibration apparatus 12 can be used as an expanded functionality (or "complex") manner as illustrated in the example embodiment of FIGS. 2 and 3, where the calibration apparatus is in communication with a mobile computing platform 18 ("MCP") that can provide documentation, data storage, analysis, computing functions, and the like. The communication link 16 between the MCP 18 and the calibration apparatus will comprise one or more digital links or streams across one or more channels embedded into both the calibration apparatus and the MCP. Examples of such digital streams include I²C, UART, IEEE 802.15.4 and the like.

During operation, the calibration apparatus 12 and MCP 18 support immediate or synchronized command execution 20. The synchronized command execution 20 allows commands to be executed as received or can be queued to be triggered by another command. An example of such commands 22 that can be either executed or queued for triggering by another command by the MCP or the calibration apparatus 12 include, for example GET_SIM_VALUE, GET_MEASUREMENT, etc. Synchronized command execution is valuable when the time coherence of data (measurement or simulation) across multiple channels 40 is important.

In the illustrated example embodiments, the calibration apparatus 12 is a portable device powered by an internal power supply 24. In one example embodiment, the internal power supply 24 is a DC battery, generator, solar power, or any combination thereof. The calibration apparatus 12 further comprises a plurality of input and output (I/O) devices 26 (or I/O modules) for receiving and transmitting data typically in the form of instructions to I/O located within remote devices 30 that includes for example, remote transceiver 14 apparatuses, MCP 18, temperature transceivers and/or pressure transceivers 28, and computers 32. In the illustrated example embodiment of FIGS. 2 and 3, the remote devices 30 are capable of receiving and transmitting instructions and data to each other and to the calibration apparatus 12.

The I/O devices 26 of the calibration apparatus 12 and remote devices 30 allow not only the transmission and receipt of data, but also allow for the calibration apparatus to take measurements and execute simulations among the remote devices. The measuring and executing of simulations by the calibration apparatus 12 on the remote devices 30 is achieved by hardware, namely one or more microcontrollers and/or microprocessors 34 and the programmable software or firmware 36 programmed therein, as illustrated in FIG. 4. The hardware 34 and software/firmware 36 provide control, calibration, and traceability (to a standard, such as for example National Institute of Standards, NIST and the like), and digital communication.

In one example embodiment, the calibration apparatus 12 is capable of measuring or simulating one or more properties 38, including physical, electrical, geospatial, and/or visual properties through the remote devices 30. Some specific examples of such properties 38 that are measured or simulated further include, pressure, flow, temperature, voltage, current, humidity, frequency, location, and image.

Within the calibration apparatus 12, the properties 38 are measured by their own dedicated measurement/simulation channel 40, such as a pressure channel, frequency channel and the like. Each channel 40 comprises channel electronics 42 that may include A/D converters, signal conditioning devices, power management devices, a microprocessor, microcontroller, and the like. In an alternative example embodiment, the calibration apparatus 12 comprises a single microcontroller or microprocessor used by the plurality of channels 40. The calibration apparatus 12 communicates through the channels 40, using one or more industrial protocols 44. Examples of such industrial protocols 44 include foundation fieldbus, HART, and Profibus.

As illustrated in FIG. 4, the channels 40 communicate with a data backplane 46 to an industrial protocol converter 48 before receiving or transmitting data/instructions to sensors or actuators, for example pressure and temperature transceivers 28. The data backplane 46 acts as a databus and is coupled communication within the calibration apparatus 12 to a user interface 52, central control module (such as a microcontroller/microprocessor 34 containing software/firmware 36) and optional wireless electronics 56 for transmitting data/instructions to the remote devices 30, including the MCP 18.

In the illustrated example embodiment of FIG. 4, the calibration apparatus 12 is an electronic device that consists of the user interface 52, a central control module 54, distributed measurement/simulation channels 40, and an internal power supply 24. The calibration apparatus 12 is used for the purpose of measurement and calibration of remote devices 30, such as sensors and actuators deployed in a variety of scientific and industrial applications with high accuracy and precision. In one example embodiment, the calibration apparatus 12 is used as a "standalone" mode, where the apparatus is utilized as a complete system and functionality is limited by options available to the user via the user interface 52.

In an alternative example embodiment, the calibration apparatus 12 is used with the MCP 18 running special calibration software/firmware 36. Here the calibration apparatus 12 is a "hub" for measurement and calibration, while connected to a MCP 18. The MCP 18 may be hand held or set upon a surface, may be battery or line powered, and capable of storing data within a database 58. The MCP 18 is in communication or interfaced to the calibration apparatus 12 digitally via a wired or wireless communication link 16. The MCP 18 is also used to "unlock" advanced features (AF) 60 of only possible with the use of MCP 18 functions 62. Examples of the AF 60 include SET_SIM, RAMP, SYNC_START, etc. Examples of the MCP 18 functions 62 include SET_SIM, RAMP, SYNC_START, etc. The MCP 18 is further used to perform complex sequences, store the data in the database 58 acquired in the calibration/measurement process, and then transfer the data to an Asset Management System (AMS) 64.

In one example embodiment, the calibration apparatus 12 contains all functionality, for example 1-100. The calibration apparatus user interface 52 may allow the user access, i.e. operation of a subset of those functions, say 1-20. While the all 100 functions can be access, i.e. operation of the entire set of functions, namely 1-100, thus unlocking functions 21-100 in the example embodiment.

Software or firmware 36 is the MCP 18 will, command the calibration apparatus 12 to perform "complex" functionality by sending multiple "simple" commands to one or more channels 40. As such, the MCP 18 will execute a procedure though, its microcontroller/microprocessor 66 to get measurements, set simulations, and aggregate other data (e.g. time, date, user signature) to perform a complete task through the calibration unit to remote devices 30. An example would be to perform an entire calibration, documenting (storing) the "as found" and "as left" states, and tagging this data with a date/timestamp and technician name, and storing such information within the MCP 18 after being executed by the calibration apparatus 12 in the remote devices 30.

The user interface 52 of the calibration apparatus 12 consists of a display 53 to visually show data to the user. The user interface 52 further comprises input devices (switches, buttons, touch screen, etc.) that the user can utilize to perform the basic functions (i.e. measure input or set output of: voltage, current, pressure, frequency, resistance, temperature, location, image, etc.).

The MCP 18 consists of a computer (microcontroller/microprocessor) 66 used to coordinate the measurement of the set inputs and set outputs 27 of the remote devices 30. In standalone mode, this coordination is based upon me inputs performed on the calibration apparatus' user interface 52. When in advanced mode (the calibration apparatus 12 being used with the MCP 18), the coordination of operations from the calibration apparatus 12 is based upon commands from the MCP 18 via the wired or wireless communication link 16. The central control module 54 also handles the transfer of information, data, and/or instructions along a databus 70 from the distributed I/O devices 26 (of the calibration apparatus 12) to the MCP and a user interface display 68 of the MCP.

Distributed measurement/simulation channels 40 (MS) are autonomous in nature and do not interact with any other module except the central control module 54. Each channel 40 handles a specific function integral to the design of said channel, that is, the operation of each channel is based upon the nature of the measurement/simulation type (voltage, current, pressure, temperature, etc.) performed by that channel. The channels 40 consist of one or more computers (microcontroller or microprocessor) 34, 36. All functions and calculations vital to the operation of said channels 40 are performed by the internal computer(s) 34, 36. The internal computers) 34, 36 communicate with the central control module 54 via the communication link (data backplane 46). The plurality of channels 40 are isolated from each other, for the purpose of signal integrity, safety, and the like. The channels 40 may be contained within the same enclosure or housing 72 as the central control module 54 or may be pluggable or remote via a wired or wireless link. Input and output functions of the channels 40 may include: temperature, voltage (AC/DC), current (AC/DC), resistance, frequency, pressure, image capture, location capture (i.e. GPS), etc. Each channel 40 of the calibration apparatus 12 can be operated locally (via integral user interface) or remotely (via one or more digital streams) to measure or simulate.

Example embodiments of an internal power supply 24 of the calibration apparatus include the following: 1) A battery pack consisting of a one to a plurality of replaceable, non-rechargeable cells, 2) a battery pack consisting of one to a plurality of non-replaceable, rechargeable cells, or 3) a battery pack consisting of one to a plurality of replaceable, rechargeable cells, 4) AC line power conditions by a power conditioner.

The calibration apparatus 12 is designed in such a way as to be intrinsically safe. This is accomplished by (but not limited to) limiting the power to the central control module 54 or any of the distributed channels 40 to 1.25 W, housing 72 materials, circuit layout, use of encapsulation, etc.

Figure 5:
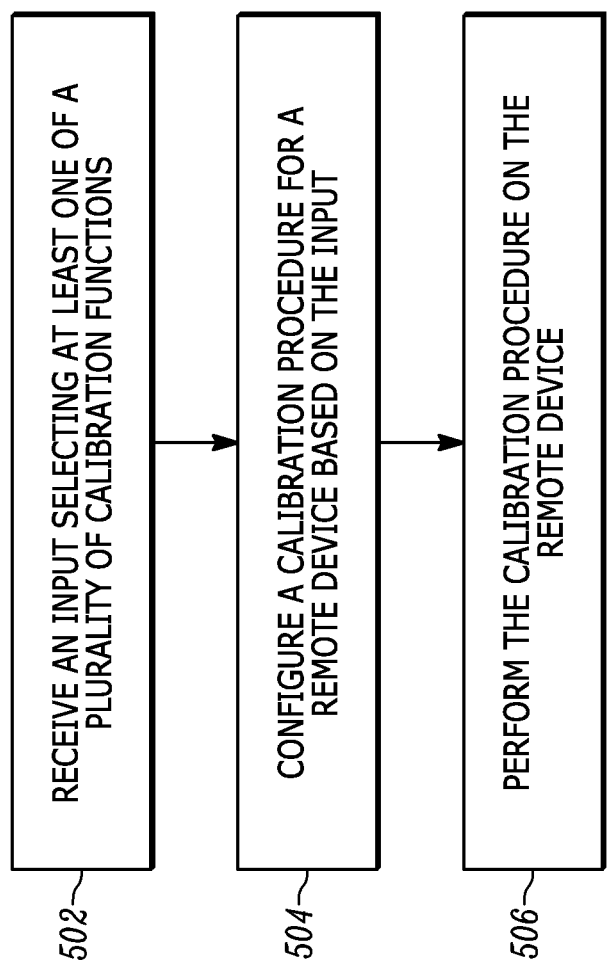
FIG. 5 is a process flow diagram of a calibration method in accordance with another example embodiment of the present disclosure.

FIG. 5 shows a process flow diagram of an example calibration method that can be performed by the calibration apparatus 12. This method is presented as just one example of the different calibration methods that can be employed by the calibration apparatus 12. The method begins at 502, where an input can be received (e.g., by a user interface 52 of the calibration apparatus 12). The input can select at least one of a plurality of calibration functions (e.g., measurement functions, simulation functions, etc.) that the calibration apparatus 12 (or at least one I/O channel 40 of the calibration apparatus) can perform on a remote device. The method continues at 504, where a calibration procedure can be configured (e.g., by the central control module 34 of the calibration apparatus 12 and and/or by the MCP 18) based on the input. For example, the calibration procedure can be based on a plurality of inputs selecting a plurality of procedures to be performed by one or more I/O channels 40. The method ends at 506, where the calibration procedure is performed on the remote device (e.g., by the one or more I/O channels 40 of the calibration apparatus 12. For example, a portion of calibration procedure can be queried such that of commands of the calibration procedure so that they are triggered by another input and/or a result of a previous step of the calibration procedure. In another example, commands of the calibration procedure can be executed as they are received. In yet another example, one or more additional commands can be added to the calibration procedure based on a result of the performing the calibration procedure. A log can be created (e.g., by the central control module 34 of the calibration apparatus 12) of the calibration.

In the foregoing specification, specific embodiments have been described. However, one of ordinary skill in the art appreciates that various modifications and changes can be made without departing from the scope of the disclosure as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The disclosure is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiment may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A portable calibration apparatus comprising:
   a plurality of input/output (I/O) hardware modules, each comprising a respective microcontroller to calibrate a respective function of a remote hardware device by simulating or measuring the respective function of the remote hardware device autonomously;
   a user interface to enable selection of each respective function to calibrate on the remote hardware device; and
   an internal power supply to provide an operating power to the plurality of I/O hardware modules,
   wherein the portable calibration apparatus is portable.

2. The portable calibration apparatus of claim 1, wherein the portable calibration apparatus communicates with a mobile computing platform over a digital communication link.

3. The portable calibration apparatus of claim 2, wherein the mobile computing platform allows the user interface to access a number of total functions provided by the at least one of the plurality of I/O hardware modules.

4. The portable calibration apparatus of claim 2, wherein the mobile computing platform transmits a control command to the portable calibration apparatus, wherein the control command is related to the calibration of the remote hardware device.

5. The portable calibration apparatus of claim 2, wherein the mobile computing platform receives a result of the calibration from at least one of the plurality of I/O hardware modules, and wherein the mobile computing platform documents the result.

6. The portable calibration apparatus of claim 1, further comprising a data backplane to enable a digital communication link to each of the plurality of I/O hardware modules.

7. The portable calibration apparatus of claim 2, wherein the mobile computing platform sends instructions to at least two of the plurality of I/O hardware modules to calibrate at least two respective functions of the remote hardware device.

8. The portable calibration apparatus of claim 1, wherein the remote hardware device comprises a plurality of unique sensors and actuators.

9. An industrial calibration system comprising:
   a portable calibration device comprising:
      a plurality of input/output (I/O) hardware modules, each comprising a respective microcontroller to calibrate a respective function of a remote hardware device according to a respective calibration procedure by measuring or simulating the respective function of the remote hardware device autonomously;
      a user interface to enable selection of each respective calibration function of at least one of the plurality of I/O hardware modules to calibrate the remote hardware device; and
      an internal power supply to provide power to the portable calibration device; and
   a mobile computing platform in communication with the portable calibration device to provide each respective calibration procedure to the portable calibration device,
      wherein each respective calibration procedure is performed to without knowledge of the other respective calibration procedure.

10. The industrial calibration system of claim 9, wherein the power source provides a power of 1.25 W or less to each separate I/O hardware module.

11. The industrial calibration system of claim 9, wherein the portable calibration device further comprises a central controller that records the results of the calibration procedure to facilitate creation of a log of the results.

12. The industrial calibration system of claim 9, wherein the mobile computing platform is in communication with the portable calibration device across a digital communication link.

13. The industrial calibration system of claim 9, wherein the internal power supply provides power to the microcontrollers of the plurality of I/O hardware modules.

14. The industrial calibration system of claim 9, wherein the mobile computing platform connects to the portable calibration device through a digital interface,
   wherein the portable calibration device acts as a calibration hub when connected to the mobile computing platform.

15. The industrial calibration system of claim 9, wherein the mobile computing platform unlocks advanced calibration features.

16. The industrial calibration system of claim 9, wherein the mobile computing platform stores data related to the calibration procedure in a database.

17. The industrial calibration system of claim 9, wherein the remote hardware device comprises a plurality of unique sensors and actuators.

18. A method for calibrating a remote hardware device comprising:
- selecting, by a remote computing platform, an I/O hardware module from a plurality of I/O hardware modules of a portable calibration apparatus to perform a respective calibration procedure comprising a simulation of a function of the remote hardware device, wherein the plurality of I/O hardware modules each performs a different calibration procedure;
- performing, by the I/O hardware module of the portable calibration apparatus, the respective calibration procedure on the function of the remote hardware device; and
- logging, by a central controller of the portable calibration apparatus, results of the respective calibration procedure.

19. The method of claim 18, further comprising configuring the respective calibration procedure by querying a portion of commands of the respective calibration procedure.

20. The method of claim 18, wherein the mobile computing platform selects the I/O hardware module without knowledge of the portable calibration device.

21. The method of claim 18, further comprising adding a command to the respective calibration procedure based on result after performance of the respective calibration procedure.

* * * * *